United States Patent [19]

Schupner

[11] 4,164,274

[45] Aug. 14, 1979

[54] ADJUSTABLE SHOCK ABSORBER

[75] Inventor: Willard J. Schupner, Palatine, Ill.

[73] Assignee: Efdyn Corporation, Geneva, Ill.

[21] Appl. No.: 876,348

[22] Filed: Feb. 9, 1978

[51] Int. Cl.² .............................................. F16F 9/44
[52] U.S. Cl. .................... 188/285; 188/287; 188/318
[58] Field of Search ............... 188/281, 282, 284, 285, 188/287, 315, 318, 319

[56] References Cited

U.S. PATENT DOCUMENTS

| | | | |
|---|---|---|---|
| 1,928,228 | 9/1933 | Olley | 188/318 |
| 3,000,043 | 9/1961 | Check | 188/281 |
| 3,207,270 | 9/1965 | Ellis | 188/287 |
| 3,446,317 | 5/1969 | Gryglas | 188/287 |
| 3,478,846 | 11/1969 | Germond | 188/287 |
| 4,057,236 | 11/1977 | Hennells | 188/287 |
| 4,076,225 | 2/1978 | Houghton | 188/287 |

*Primary Examiner*—Edward R. Kazenske
*Attorney, Agent, or Firm*—Darbo & Vandenburgh

[57] ABSTRACT

A spool valve is positioned within the reservoir of a hydraulic shock absorber. The valve body is secured to the pressure tube of the hydraulic cylinder and has openings aligned with ports therein. The spool has threads engaging threads on the valve body so that as the spool is rotated the spool is moved axially to cause the lands on the spool to cover more or less of the openings in the valve body. A rotatable shaft device extends radially through the external housing and into the reservoir. At its inner end the shaft device has a gear which engages a gear on the spool so that as the shaft device is rotated the spool also is rotated.

3 Claims, 3 Drawing Figures

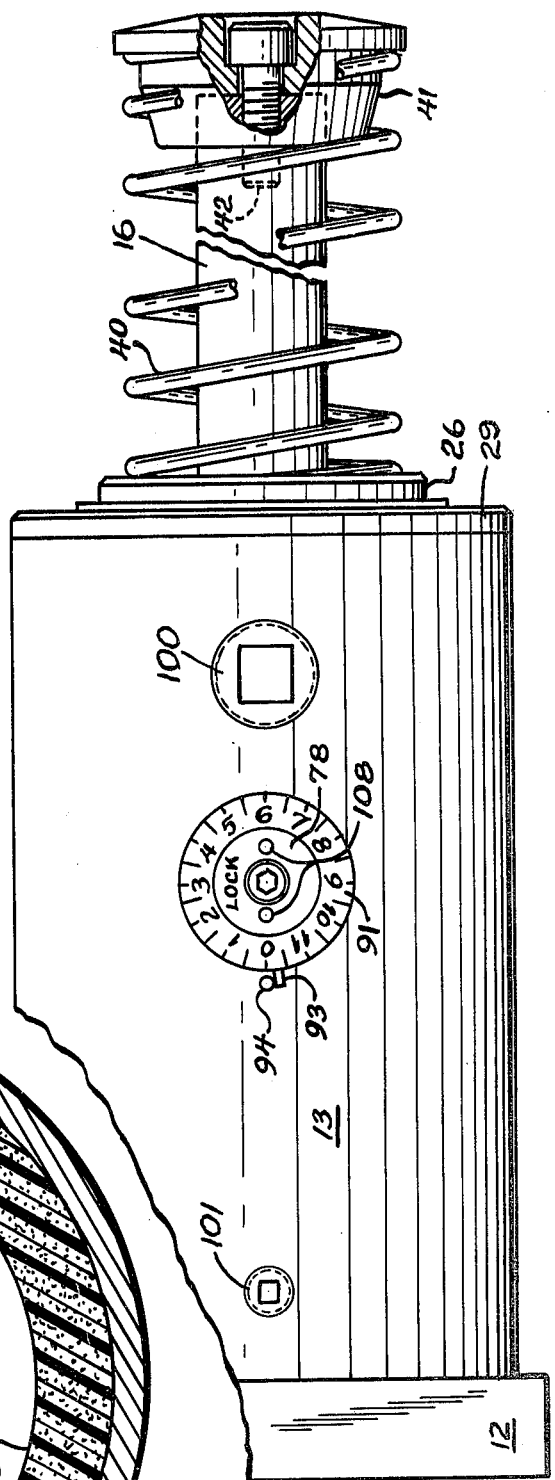
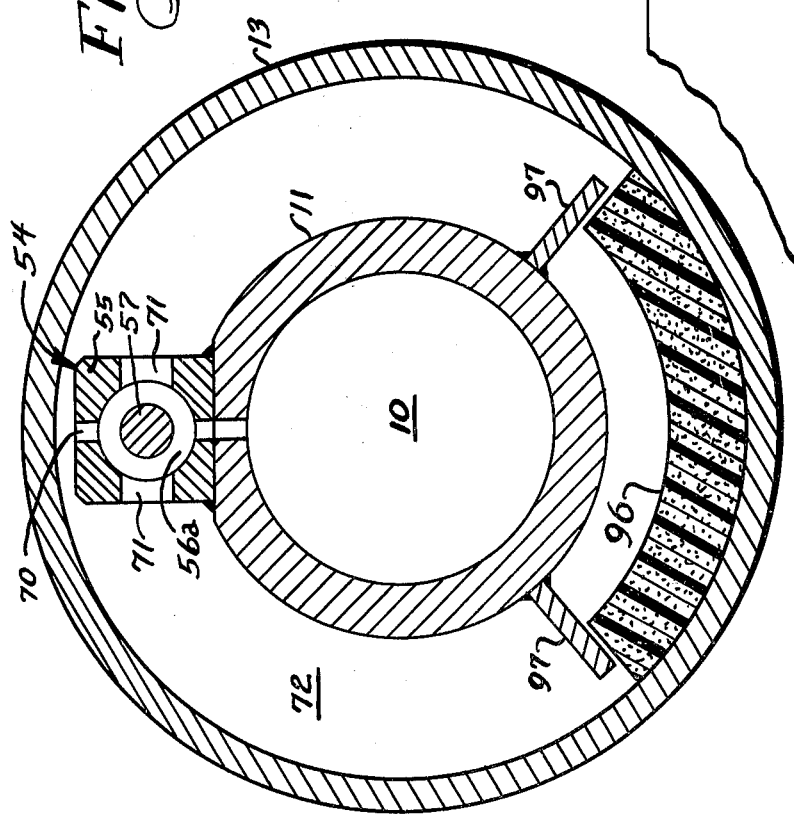

ADJUSTABLE SHOCK ABSORBER

BACKGROUND AND SUMMARY OF THE INVENTION

There are numerous forms of adjustable shock absorbers which have a reservoir surrounding a hydraulic cylinder to receive the oil pumped out of the cylinder as a piston in the cylinder is forced into the cylinder by a force such as that generated by a shock, etc. At that time the oil is pumped from the cylinder through a plurality of passages, a plurality being used to increase the resistance to the applied force as the piston moves deeper into the cylinder by reason of the piston blocking one or more. An adjustable control valve is used in conjunction with each of the passages to permit the force resistance of the shock absorber to be varied as desired. The present invention is concerned with an improved form of that control valve.

A common form of the prior art control valves has been a sleeve which fits about a hydraulic cylinder and is movable with respect to the cylinder so as to vary the size of the passages leading from the ports in the cylinder to the hydraulic fluid reservoir. In some instances the sleeve is moved axially so as to vary the alignment of openings in the sleeve with respect to the ports in the cylinder and thereby change the cross-sectional size of the passage at that point. Examples of such a structure will be seen in U.S. Pat. Nos. 3,693,767 and 3,998,302. In other instances the sleeve is movable rotationally so as to vary the effective cross-sectional size of a part of the passageway. See, for example, U.S. Pat. Nos. 3,997,037 and 3,478,846. Other forms have included a rotatable valve member fitting within the piston (U.S. Pat. No. 3,491,993); a separate sleeve valve or the like received within a chamber contiguous to the cylinder, with the sleeve being rotatable to adjust the passage size (U.S. Pat. No. 3,446,317); and a rotationally adjustable valve in the end of the cylinder (U.S. Pat. No. 2,627,405 and 3,990,548).

The principal object of the present invention is to provide a form of valve for such a hydraulic shock absorber which will have a high degree of accuracy in the setting of the valve and which will be little affected by changes in viscosity; and such a valve which will be easy to service should maintenance be required. The present invention accomplishes this by the use of a separate spool valve mounted in the hydraulic fluid reservoir and having a spool which, when rotated, is moved axially by threads which interengage the spool and the valve body. These threads are at one end of the spool and at the other end the spool has a gear which is engaged by a gear on an operating shaft rotatable about an axis radially aligned to the axis of the spool. One end of the valve is accessible through the opening within which the operating shaft is mounted while the other end of the valve is accessible through ports in the shock absorber body. The spool has lands thereon which move across the inner ends of openings in the valve body as the spool moves axially. The lands have sharp edges at the corners thereof at which the flow is controlled in conjunction with the inner ends of the openings in the valve body.

Other objects and advantages will become apparent from the following description taken in conjunction with the drawings.

DESCRIPTION OF THE DRAWINGS

FIG. 2 is a section taken at line 2—2 of FIG. 1; and

FIG. 3 is a fragmentary elevational view as seen at line 3—3 of FIG. 1.

DESCRIPTION OF SPECIFIC EMBODIMENT

Figure 1:
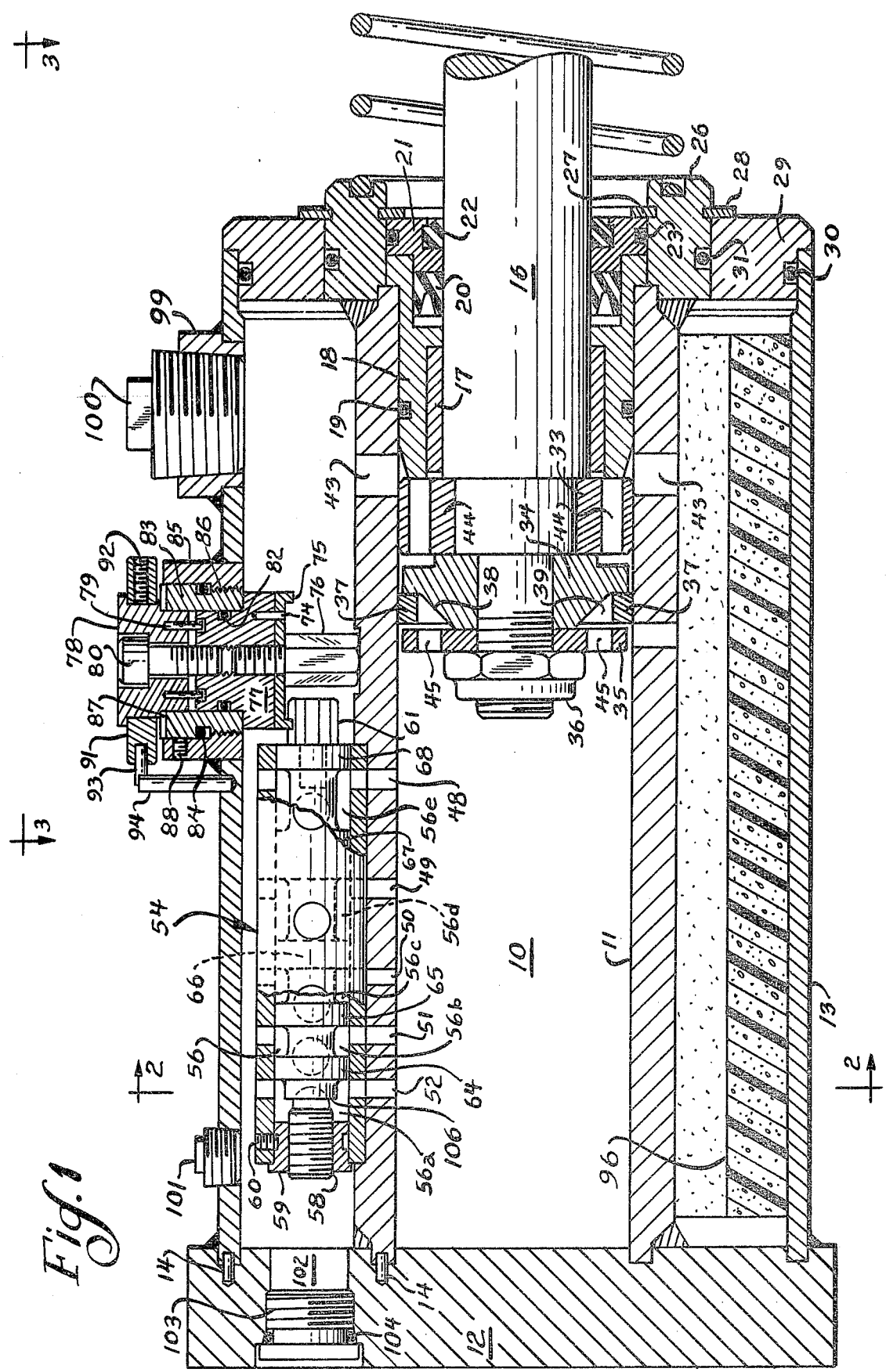
FIG. 1 is a section taken longitudinally through a shock absorber embodying the present invention.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

A hydraulic cylinder 10 is defined by a pressure tube 11 and a head 12 to which it is welded. The head (in part) and the pressure tube may be referred to herein as a cylinder part. A housing 13 surrounds the pressure tube and is also welded to the head 12. Locating pins 14 are merely employed for alignment purposes prior to welding.

A piston rod 16 extends into the cylinder through its open end. It is slidably mounted in a bearing 17 held by a gland 18. An O-ring seal 19 is provided between the gland and the pressure tube. An elastomeric seal 20 fits about the piston rod and is held by gland 18 and a wiper retainer 21. The wiper retainer holds a flange of gland 18 between it and the end of pressure tube 11 and also holds the elastomeric wiper 22 and an O-ring seal 23.

The front head 26 is welded to pressure tube 11. It receives a removable snap ring 27 which holds the wiper retainer 21. At the outside of the front head a snap ring 28 holds a jacket ring 29 between it and the housing 13. There is an O-ring 30 about the outside of the jacket ring and an O-ring 31 about its inside.

Mounted on the inner end of the piston rod are a rod bearing 33, a piston 34 and a piston ring retainer 35. These are all held on the piston rod by a nut 36. An annular piston ring 37 is mounted on the piston and has a central opening 39 therethrough. Thus there is an opening within the piston ring and about the angular face 38 of the piston.

The piston rod, and thus the piston, is returned outwardly (to the right in FIG. 1) by a spring 40 which is in compression between the front head 26 and a cap 41 secured to the piston rod by a screw 42. During such a return stroke of the piston the hydraulic fluid from the reservoir can freely return to the cylinder through openings 43 in the pressure tube, openings 44 in the rod bearing, opening 39 in piston ring 37 and openings 45 in the piston ring retainer 35. It will be noted in FIG. 1 that there is a space to the left of the piston ring, between the piston ring and the piston ring retainer. This permits the piston ring to move to the left during the return stroke of the piston so that the hydraulic fluid can flow freely past the piston ring to opening 39.

During the force resisting stroke of the piston, when it moves deeper into the cylinder, the hydraulic fluid in the cylinder 10 flows into a reservoir 72 surrounding the pressure tube through a plurality of passages. These passages include ports in the cylinder walls and a valve means to control the rate of flow through the various passages respectively. A series of such passages are used at intervals along the axis of the cylinder so that as the piston moves deeper into the cylinder it closes or passes some of the ports thus reducing the number of passages available for such flow of hydraulic fluid and correspondingly increasing the resistance to the inward movement of the piston. In the illustrated embodiment there are five such passages having ports 48-52 at their inner ends, i.e., in the wall about the cylinder. The valve means, generally 54, of the present invention controls the rate of flow through each of the five passages. It comprises a valve body 55 welded to the pressure tube 11. The valve body defines an inner cylindrical opening or chamber 56 within which is a valve spool 57. One end of the spool has threads 58 and is mounted in an internally threaded, thread nut 59. The nut is held in place in the valve body by a set screw 60 and when in place forms a part of body 55. A pinion gear 61 is formed on the other end of the spool.

The spool has five annular lands 64-68. These lands fit snugly to the inner wall of the valve body to effectively prevent the passage of hydraulic fluid therebetween. The outer corners of the lands are right angled and thus present sharp edges. Between the adjacent lands, and between land 64 and spool nut 59, are chamber portions 56a-56e of the internal opening or chamber 56, which portions form a part of the respective passages between the cylinder 10 and the reservoir. The respective passageways also include openings 70 and 71 extending through the valve body from the interior opening portions 56a-56e to the reservoir 72.

For the purpose of rotating the spool, a crown gear 75 engages spool gear 61. The crown gear is secured to a shaft by means of a screw 76 and a pin 74. The shaft is formed in two parts, an inner shaft part 77 and an outer shaft part 78. These are connected by pins 79 and a cap screw 80. An O-ring 82 surrounds the inner shaft part 77, between it and an adjusting sleeve 83. Similarly, an O-ring 84 surrounds the adjusting sleeve between it and a fixed sleeve 85, which is welded to the housing 13. There are interengaging threads 86 on the two sleeves, and the end of the adjusting sleeve has slots 87 by which it may be engaged by a spanner wrench or the like for the purpose of rotating it. The adjusting sleeve is releasably locked in place in the fixed sleeve by a set screw 88.

A dial 91 is mounted on the outer shaft part 78 and is fixed in place by a set screw 92. Pins 93 on the dial and 94 on the housing permit the dial, and thus the shaft, to be rotated only through about three hundred and sixty degrees.

Within the reservoir is a cellular rubber pad 96. This may be compressed by the hydraulic fluid thus increasing the space available for the reservoir to hold hydraulic fluid as the piston moves into the cylinder during its force absorbing stroke. Baffles 97 restrain the pad against excessive movement within the reservoir. A sleeve 99 welded to the housing is internally threaded. It provides a hydraulic fluid fill opening which may be closed by a plug 100 or the like. The housing is also provided with a threaded opening closed by a plug 101. This opening will permit air to be exhausted as the reservoir is filled with hydraulic fluid. Also, it provides access to set screw 60. An access port 102 is provided through the head 12. It is axially aligned with the axis of the spool 57 and permits the spool and the spool nut to be inserted into and removed from the valve body. This access port is closed by a threaded plug 103 holding a sealing O-ring 104.

To assemble the valve and the valve adjusting device, the spool nut 59 is mounted on the spool and the two are inserted through access opening 102 to the valve body 55. The nut is then locked in place by set screw 60. The crown gear 75 is mounted on the inner shaft part 77 by means of the screw 76 and the pin 74. With the O-ring 82 in place, the inner shaft part is slipped into the adjusting sleeve 83. After mounting O-ring 84 on the adjusting sleeve, that sleeve is threaded into the fixed sleeve 85. It is moved inwardly until the head of screw 76 abuts the pressure tube 11, after which it is backed out just slightly to provide clearance. The head of the screw 76 is of a length such as to serve to measure the correct positioning of the crown gear with respect to the spur gear 61 on the spool. The adjusting sleeve is then locked in place by set screw 88. The outer shaft part 78 having the dial thereon is then put into place, along with pin 79 and cap screw 80.

The shaft is then rotated in a direction such that the rotation of the spool causes the interengaging threads 58 to move the spool to the left as viewed in FIG. 1. Such continued movement will ultimately bring abutment 106 of the spool into contact with the spool nut 59. At this point, all of the fluid passages are closed (but just barely) by the lands on the spool and this is the "zero" position of the valve. With set screw 92 loose, the dial is moved to the zero position illustrated in FIG. 3. Set screw 92 is then tightened to lock the dial in that position on the outer shaft part.

Rotation of the shaft in the opposite direction will cause a corresponding reverse rotation of the spool with the result that the spool will move to the right as viewed in FIG. 1. This causes the lands of the spool to gradually open the fluid passageways between the cylinder and the reservoir. When these passageways have been opened to the desired degree, the screw 80 of the shaft is tightened to draw the two shaft parts towards each other (that is, the cap on the screw urges the outer shaft part towards the inner and the threads on the screw draw the inner shaft part towards the outer part). Openings 108 are provided in the outer shaft part 78 to permit it to be held by a spanner wrench or the like while the cap screw 80 is being tightened or loosened. This causes the two shaft parts to abut the opposite ends respectively of the adjusting sleeve 88 and thus immobilize the shaft. If it is subsequently desired to change the setting of the valve 54, screw 80 is first loosened to permit the shaft to be rotated within the adjusting sleeve.

Should it be necessary to disassemble the valve for servicing or the like, this can be done by reversing the operations described for the assembly thereof.

Assuming that the cylinder and the reservoir have been filled with hydraulic fluid, and that all of the ports are closed by plugs or the like, the shock absorber is then ready for use. A force, such as caused by an impact or other force to be absorbed, is applied between the head 12 and the cap 41 of the piston rod in a sense such as to force the piston deeper into the cylinder. This movement of the piston causes the hydraulic fluid in the cylinder to flow out through the passages leading from ports 48-52 to the reservoir. The rate at which that flow can occur (for a particular applied force) is controlled by the setting of valve 54. During the return stroke of the piston, the hydraulic fluid can easily return to the cylinder from the reservoir through the previously described passage commencing with the openings 43 in the pressure tube 11 and terminating with openings 45 in retainer 35.

I claim:

1. A shock absorber including a cylinder part defining a cylinder, a piston in said cylinder, a housing about said cylinder part and defining a space therebetween to serve as a hydraulic fluid reservoir, said cylinder part defining an axis along which said piston moves, said cylinder part having at least one port therethrough which port forms part of a fluid passage between the cylinder and the reservoir to permit hydraulic fluid to flow through said passage from the cylinder to the reservoir when the piston is forced in one direction in said cylinder by an externally applied force to be absorbed, and valve means in said space and in the fluid passage to permit adjustment of the rate of flow of the hydraulic fluid from the cylinder to the reservoir, said valve means including an external adjustment handle, said shock absorber being characterized by said valve means comprising:

a valve body member fixedly mounted in the reservoir and having an internal chamber and a pair of openings from the chamber to the outside of the body member, one of said openings communicating with said port and the other opening communicating with said reservoir;

an annular spool member within said chamber and having an annular land sealingly contacting the valve body member, said spool member being rotatable in said chamber;

said body member defining an axis along which said spool member moves in said chamber, the latter axis being parallel to said cylinder part axis, said chamber being cylindrical, whereby as the spool member moves the extent to which said land covers the chamber end of at least one of said openings is varied, despite the rotational portion of the spool member; and an adjustment device connected to the spool member for so moving said spool member, said device including said handle, said device including thread means interconnecting said body member and said spool member whereby rotation of the spool member moves it axially with respect to the body member, shaft means extending through said housing, normal to said body member axis and rotatable with respect to said housing, said shaft means having external and internal ends with said handle being secured to said external end, and gear means interconnecting the internal end of the shaft means and said spool member for rotating the spool member in response to rotation of the handle.

2. A shock absorber as set forth in claim 1, wherein said cylinder part has a plurality of said ports and said valve means controls the flow through all of said ports, said absorber being further characterized by:

said body member being secured to said cylinder part, said body member having a plurality of pairs of said openings, one opening of each pair communicating with one of said ports respectively; and said spool member having a land for each pair of openings, which land is positioned to adjust the extent to which it covers the chamber end of one of the openings of the respective pair as said spool is moved in said chamber, said lands having edges which are in juxtaposition to the respective openings, said edges being sharp.

3. A shock absorber as set forth in claim 1, wherein said housing including a fixed sleeve about said shaft means;

including an adjustment sleeve within said fixed sleeve and adjustable along the axis of rotation of the shaft means, and means releasably affixing the adjustment sleeve within the fixed sleeve, said adjustment sleeve having an external end and an internal end; and wherein said shaft means includes an external shaft part, an internal shaft part, means rotatably interconnecting the shaft parts while permitting relative axial movement of one with respect to the other, and a cap screw having an external head bearing against the external shaft part and threads engaging the internal shaft part so that the parts may be drawn together, each shaft part having a shoulder abutting the respective end of the adjusting sleeve whereby when the parts are drawn together by the cap screw the adjusting sleeve is clamped therebetween and the shaft means is thus immobilized.

* * * * *